(12) United States Patent
Berrueta

(10) Patent No.: US 12,171,170 B1
(45) Date of Patent: Dec. 24, 2024

(54) IRRIGATION APPARATUS

(71) Applicant: Patricia Berrueta, Nampa, ID (US)

(72) Inventor: Patricia Berrueta, Nampa, ID (US)

( * ) Notice: Subject to any disclaimer, the term of this patent is extended or adjusted under 35 U.S.C. 154(b) by 0 days.

(21) Appl. No.: 18/410,359

(22) Filed: Jan. 11, 2024

Related U.S. Application Data

(60) Provisional application No. 63/444,623, filed on Feb. 10, 2023.

(51) Int. Cl.
*A01G 25/09* (2006.01)

(52) U.S. Cl.
CPC .................................. *A01G 25/092* (2013.01)

(58) Field of Classification Search
CPC .................................................... A01G 25/092
(Continued)

(56) References Cited

U.S. PATENT DOCUMENTS

| | | | | |
|---|---|---|---|---|
| 3,623,663 | A | * | 11/1971 | Koinzan .............. A01G 25/092 239/731 |
| 3,720,374 | A | * | 3/1973 | Ross ..................... A01G 25/092 239/731 |

(Continued)

*Primary Examiner* — Chee-Chong Lee
(74) *Attorney, Agent, or Firm* — John Rizvi; John Rizvi, P.A.—The Patent Professor

(57) ABSTRACT

There is provided herein an irrigation apparatus which can effectively water in corners and around obstructions present in agricultural fields. The bulk of the irrigation apparatus constitutes an elongated water pipeline. The pipeline is made up of a plurality of pipe spans which are joined together by joining sections. A wheeled support structure is located below each joining section, and a series of water sprinklers are also located along the pipe spans between the joining sections. At the proximal end of the elongated water pipeline, there is provided a center tower. The elongated pipeline operably couples with and rotates around the central tower by its proximal end. On an opposing distal end of the elongated water pipeline there is provided a driving support end. The driving support end has a supporting structure as well as components which drive, i.e., cause the driving support end to rotate around the center tower. The support structure of the driving support end constitutes a holding end supporting the distal end of the elongated water pipeline and opposing bracing ends connected to a platform of the driving support end. The platform is provided to support the driving components of the driving support end. The platform has a top surface, a proximal longitudinal end closer to the center tower, and an opposing parallel distal longitudinal end further from the center tower. The platform has an inner wheel centrally located along the proximal longitudinal end of the platform which closer to the tower, and two outer wheels equidistantly spaced apart and located along the distal longitudinal end of the platform which is further away from the central tower. The driving components of the driving support end are provided on the top surface of the platform. Specifically, the top surface of the platform has disposed thereon a gasoline engine, a water turbine, and a gear box, the gear box being situated between the gasoline engine and the water turbine. The water turbine is connected to the gear box by a drive shaft, and the gasoline engine is releasably connectable to the gear box by the same drive shaft. When operating, the water turbine is fed with water from a pipe section located on the distal end of the elongated water pipeline, which pipe section also feeds an extender feeding sprinkle.

20 Claims, 12 Drawing Sheets

(58) Field of Classification Search
USPC .......................................................... 239/728
See application file for complete search history.

(56) References Cited

U.S. PATENT DOCUMENTS

| | | | | |
|---|---|---|---|---|
| 4,209,035 | A * | 6/1980 | Hait | ..................... A01G 25/092 |
| | | | | 239/728 |
| 4,277,023 | A | 7/1981 | Anderson et al. | |
| 4,340,183 | A | 7/1982 | Kegel et al. | |
| 4,569,481 | A | 2/1986 | Davis et al. | |
| 4,674,681 | A * | 6/1987 | Meis | ..................... A01G 25/092 |
| | | | | 239/744 |
| 4,676,438 | A * | 6/1987 | Sesser | .................. A01G 25/092 |
| | | | | 239/524 |
| 5,341,995 | A * | 8/1994 | Leatch | ................. A01G 25/092 |
| | | | | 239/731 |
| 5,695,129 | A * | 12/1997 | Korus | ................... A01G 25/092 |
| | | | | 239/732 |
| 6,726,132 | B2 * | 4/2004 | Malsam | ............... A01G 25/092 |
| | | | | 239/69 |
| 8,369,996 | B2 * | 2/2013 | Choat | .................... A01G 25/16 |
| | | | | 239/69 |
| 9,386,753 | B1 * | 7/2016 | Charipar | ............. A01G 25/092 |
| 10,687,484 | B1 | 6/2020 | Williams | |
| 2021/0252909 | A1 * | 8/2021 | Hunter | ..................... B60B 11/02 |

\* cited by examiner

IRRIGATION APPARATUS

CROSS-REFERENCE TO RELATED APPLICATIONS

This application claims the benefit of U.S. Provisional Patent Application Ser. No. 63/444,623, filed on Feb. 10, 2023, which is incorporated by reference herein in its entirety.

FIELD OF THE INVENTION

The present invention relates generally to the field of irrigation. More particularly, the present invention relates generally to the field of agricultural irrigation.

BACKGROUND OF THE INVENTION

Along with sunlight and proper soil content, one of the main requirements for sustainable agricultural production is the availability of consistent irrigation. While rainfall can provide some of the necessary watering of agricultural fields, the inherent inconsistency and unreliability of rainfall results in the need for supplemental irrigation for most agricultural crops. Such is ever more the case in warmer and drier climates, since in those environments an untimely or an inconsistent watering of fields can impair the growth of crops and can reduce the agricultural yield of such fields.

Irrigation systems are generally of two major types, i.e., center pivot irrigation systems and lateral irrigation systems. Center pivot irrigation systems or machines have been used for many years to irrigate circular areas of a field or the like. In center pivot irrigation systems, the system irrigates a field in circular arc or path. However, such irrigation of only a circular portion of the field space leaves corners of the square field space or other irregular perimeter areas without irrigation. Thus, these portions of the field will either go unplanted or will have reduced yields due to lack of water. It is possible to have those sections watered manually, but such incurs an increase in manpower costs.

One other limitation of most irrigation systems, and especially center pivot irrigations systems is that it cannot adequately address situations wherein there are portions of fields that contains obstructions such as buildings or tree patches. Such obstructions usually require that the irrigation equipment be turned off and repositioned to avoid the obstruction. Alternatively, the irrigation system can be allowed to soak the obstruction, but in cases where the obstruction is a building, such is generally undesirable. Even when the obstruction is a natural obstruction such as a tree patch, irrigating such an area is wasteful of water, which can be very costly, especially in locations wherein water is scarce.

Similar to circular pivot irrigation systems when a lateral move irrigation system encounters one side of an obstruction, it cannot irrigate the area on the other side of the obstruction which dramatically affects the irrigation capability of the system. Thus, to increase productive capacity of the field space's corners or irregular perimeter areas, these areas can be irrigated by adding at least one auxiliary pipeline adjacent a distal end of the main pipeline, commonly referred to as a corner unit. The corner unit can irrigate field space areas outside of the circular area. Corner units are capable of moving as needed to extend into the corners or other irregular areas by transitionally rotating about the distal end of the main pipeline as the main pipeline rotates about the center pivot.

Corner units generally either lead ahead or lag behind the main pipeline, but not both. For a field space that allows for the main pipeline to rotate approximately 360°, the ability for the auxiliary pipeline to either lead or lag the main pipeline is usually not problematic. However, in field spaces that are either partially circular, i.e., that do not allow for an approximately 360° rotation of the main pipeline in the field space, or that include boundaries or obstructions that do not optimally allow for the auxiliary pipeline to either lead or lag, the choice of either a leading or a lagging auxiliary pipeline is insufficient.

Accordingly, there remains a need for a solution to at least one of the aforementioned problems. For instance, there is an established need for a means to effectively water fields in corners of square field space and/or in fields which contain obstructions which overcomes the aforementioned issues with circular pivot irrigation and corner systems.

SUMMARY OF THE INVENTION

The present invention can be directed to a circular pivot irrigation system that requires no electricity and can run by employing a water turbine on a terminal location of the elongated water pipeline in order to drive the circular motion of the pipeline. The water turbine can be located on a platform which has three wheels, one on an inside portion of the platform, and two wheels located on an outside portion of the platform, which wheel placement surprisingly enables the platform at the end of the pipeline to maintain a circular direction of motion when being driven by the water turbine. The use of a pipe section connected to the distal end of the pipeline permits the simultaneous feeding of water to the water turbine to move the platform, as well as to an extended water nozzle which provides for extended irrigation coverage into corner spots which were previously unreachable without the use of a corner unit.

In a first implementation of the invention there can be provided an irrigation apparatus comprising:
  an elongated water pipeline comprised of a plurality of pipe spans each joined together by joining sections;
  a wheeled support structure located below each joining section;
  a series of water sprinklers located along each of the pipe spans between the joining sections;
  a center tower connected to a proximal end of the elongated water pipeline, which proximal end is configured to operably couple with and rotate around the center tower;
  a driving support end connected to a distal end of the elongated water pipeline, which is opposite the proximal end, and which comprises:
    a supporting structure having a holding end supporting the distal end of the elongated water pipeline, and opposing bracing ends,
    a platform having a top surface which supports the bracing ends of the supporting structure, a proximal longitudinal end, and an opposing parallel distal longitudinal end, the proximal longitudinal end being closer to the center tower than the distal longitudinal end,
    an inner wheel centrally located along the proximal longitudinal end of the platform;
    two outer wheels equidistantly spaced apart along the distal longitudinal end of the platform,
    a gasoline engine disposed on the top surface of the platform, a water turbine disposed on the top surface of the platform, a gear box disposed on the top surface of the platform between the gasoline engine and the water turbine, and wherein the water turbine is connected to the gear box by a drive shaft, and wherein the gasoline engine is releasably connectable to the gear box by the drive shaft, and wherein the distal end of the elongated water pipeline has a pipe section which is configured to feed water to the water turbine and to an extender feeding sprinkler.

In one aspect of the invention, the irrigation apparatus is suitable for the irrigation of any type of agricultural field of any shape, be it square, rectangular, circular, semi-circular, oblong, and combinations thereof.

In another aspect of the invention, the elongated water pipeline can be any commercially available agricultural pipeline, but in one embodiment can be comprised of at least three pipe spans, which can each be from about 20 meters to about 40 meters in length, and from about ½ inch to about 15 inches, preferably from about 1 inch to about 12 inches, and most preferably from about 2 inches to about 10 inches in outside diameter, and more preferably can be made of metal, e.g., galvanized light steel or aluminum, elastomer material, polymer such as polyvinyl chloride (PVC) and the like, with PVC being most preferred. Preferably, the pipe spans, sometimes knows as lateral pipes, can be curved in an arc, and supported underneath on trusses, e.g., triangular support frames along the pipe span length such that each pipe span has the appearance of an overturned canoe shape, e.g., an arced truss support structure. The support frames for the pipe span can be from about 1.5 to about 3 m apart.

In another aspect of the invention, the pipe spans can each be joined together by joining sections which are flexible joints, made of a flexible elastomer material such as EPDM, rubber, polyethylene, polypropylene, and copolymers thereof, which connect the outer end of one pipe span with the inner end of the adjacent pipe span, and wherein the ends of the flexible joints have any of flanges, valves, and rubber seals at ends of the flexible joints.

In yet another aspect of the invention, the wheeled support structure located below each joining section can be a wheeled A-frame support frame, which can range from 2.5 meters to about 3.5 meters in height, preferably about 3 meters. The A-frame can be made of a triangular shape with a base length parallel to the ground, which is supported by, i.e., runs on one or two wheels, e.g., flotation wheels, and the two other parts of the triangle are two angled lengths meeting at the pipe line joining section. The two angled lengths are of a V-shape, i.e., they have a joined point at the bottom which connects to the base length and extends up at an angle into two separate lengths of increasing distances apart, till they connect to the ends of the joining section, using any conventional means such as is used for such purposes, e.g., such as brackets, or clasps and the like. In one embodiment, the pipeline can have two different wheeled support structures used, wherein the support structure closest to the center tower can be a one-wheeled support structure, and the other support structure can be a two-wheeled support structure.

In yet even another aspect of the invention, a series of water sprinklers can be located along each of the pipe spans between the joining sections; and can comprise downward facing sprinklers, sprayers, or bubblers which can pass up from pipe span and then reverse direction passing through the triangular support frames and face the ground and can preferably be from about 1.5 to about 3 meters apart. In one embodiment, the sprinklers can be circle rotating sprinklers which are equidistantly spaced apart along the length of the pipe span. Preferably there can be from about 5 to 10 spaced apart sprinklers along each pipe span.

In yet one other aspect of the invention, the center tower connected to a proximal end of the elongated water pipeline, is a central pivot point for the irrigation apparatus. The center tower is anchored to a permanent location in a field and is of a pyramidal shape comprised of pivot legs, lateral support beams, a riser pipe, a pivot swivel, an optional control panel, and if a control panel is used, an optional section of J-pipe and a collector ring may also be employed. The pivot legs are commonly bolted to a concrete pivot pad to provide the necessary support. The riser pipe is connected to the first pipe span through the pivot swivel and the riser pipe supplies water to the rest of the pivot from an underground source, such as a river, stream, lake, pond or from a community utility water provider. In one embodiment herein, the irrigation apparatus does not run on electricity and as such a control panel and its components are not employed. The apparatus' pipeline can have a proximal end which is closest to the center tower and a distal end which is furthest from the central tower. In another embodiment, the proximal end of the pipeline is configured to operably couple with and rotate around the center tower. The center tower can be from 3 to 5 meters, preferably from 3.5 to 4.5 meter tall.

In yet even one other aspect of the invention the irrigation apparatus can have a driving support end which can be connected to a distal end of the elongated water pipeline, which is opposite the proximal end. The driving support end can be used to drive, i.e., provide the power to the wheels of the driving support end and the wheels of the wheeled support structure under each joining section to rotate the pipeline around the center tower, and can also optionally be used to provide an extended watering area by use of an end gun which is attached thereto. The driving support end can also support, the components providing the driving power and simultaneously support the distal end and the pipe section providing the distal end gun sufficient support. The driving support end can comprise a supporting structure having a holding end supporting the distal end of the elongated water pipeline and opposing bracing ends. The supporting structure can be the same or different from the A-frame support structure described herein as being used to support the joining sections between the pipe spans and can use the same or different points of connection to the joining sections described herein above.

In yet even another aspect of the invention, the driving support end can also comprise a platform having a top surface which supports the bracing ends of the supporting structure, a proximal longitudinal end, and an opposing parallel distal longitudinal end, the proximal longitudinal end being closer to the center tower than the distal longitudinal end. The platform can be of any suitable shape but preferably may be in the shape of a rectangle or square. The platform can have an inner wheel centrally located along the proximal longitudinal end of the platform, i.e., the side closes to the center tower, and can have two outer wheels equidistantly spaced apart along the distal longitudinal end of the platform. The platform can be of any suitable size, and preferably can be a rectangle with longitudinal lengths of from about 15 to about 20 feet, preferably from about 16 to about 19 feet, and a width of from about 10 to about 15 feet, preferably about 11 feet to about 14 feet. The wheels of the platform can be from about 5 feet up to about 10 feet, preferably from about 6 feet up to about 8 feet and most preferably about 7 feet. The wheels can have spokes and cleats and can have a 4 inch wheel axle which rotates in a hanger that has grease zerks.

In yet still one other aspect of the invention, the platform can have a gasoline engine disposed on the top surface of the platform, which can be of from about 5 horsepower up to about 100 horsepower, preferably from about 6 horsepower up to about 100 horsepower, and most preferably from about 8 to 10 horsepower. The gasoline engine can also comprise a gasoline tank to supply gasoline to the gasoline engine. The gasoline engine can be mounted on the platform on rails, preferably two rails, which allow the gasoline engine to be disconnected from the gear box when not in use. In a preferable embodiment, the irrigation apparatus can be used without the gasoline engine being employed. The rails may allow the gasoline engine to connect or disconnect from the gear box by a releasable connection to the drive shaft therebetween.

In yet still even another aspect of the invention, the driving support end can have a water turbine disposed on the top surface of the platform. The water turbine can be any commercially available water turbine and can preferably be a water turbine that can generate from about 100 watts up to about 50 kilowatts, preferably from about 500 watts up to about 35 kilowatts. The water turbine can be fed by a distal portion of the pipeline, beyond the last pipe span. The water turbine can be fed with a water pressure of at least 45 psi, preferably at least 60 psi, and can produce up to 5 horsepower of mechanical energy which can be transmitted to the drive shaft connected to the wheels. The interaction of the drive shaft(s) described herein will be understood by those skilled in the art to operate with gears, sprockets, and cables/belts as would be known to those skilled in the art. The water turbine can operate without any electrical power and without being connected to an electrical engine. The mechanical energy created by the water turbine from the water passing through the blades of the water turbine can be transmitted via gears, sprockets, cables/belts to the gear box which can in turn use the necessary drive shafts to power the wheels alongside the platform which are also connected to the gear box via drive shafts in a manner as would be understood by those skilled in the art.

In another aspect of the invention, the driving support end can have a gear box disposed on the top surface of the platform between the gasoline engine and the water turbine, and wherein both the water turbine and the gasoline engine can be connected (releasably for the gas engine) to the gear box by the drive shaft as would be understood by those skilled in the art. The gear box which is connected to the water turbine and releasably to the gas engine, can be connected to separate drive shafts therefrom which can be used to power the wheels of the driving support end as would be understood by a person of ordinary skill in the art.

In yet another aspect of the invention, the distal end of the elongated water pipeline, i.e., the section beyond the last pipe span, can have a pipe section which is configured to feed water to the water turbine and simultaneously to an extender feeding sprinkler. The water turbine also can have an output (a discharge exit) which also functions to provide water via a sprinkler nozzle in the direction beyond the distal longitudinal end of the platform, which is in addition to the water being provided by the extender feeding sprinkler, also referred to herein as the endgun. This distal end of the elongated water pipeline can have a valve positioned ahead of both the water turbine feeding pipe and the end gun, which can be used to control water flow to the water turbine. In one embodiment, the rate of water flow to the turbine can control the mechanical power provided to the gearbox and the drive shafts driving the wheels along the platform, and as such, can control the speed of movement of the irrigation apparatus.

In yet still even another aspect of the invention, the driving support end can have a rod that is mounted on a swivel at the end of the platform, e.g., wherein the front of the platform has two beams emanating from the end, e.g., a distance of 2-4 feet from the end of the platform, the beams being connected therebetween by an axis having a central swivel which has a rod positioned thereon. The rod has a portion of which extends above the height of the swivel and backwards over and above the platform, and a length of the rod which also extends below the swivel and outwards in front of the ends of the beams. The rod on the swivel can be set at angle of about 30 to 45 degrees from the plane of the platform, so that the bottom portion of the rod extends beyond the end of the beams, and the top portion of the rod is angled in and over the top of the platform. The top of the rod can be attached to a spring which is attached to a cable, the cable running the length of the platform and above the platform, the cable being connected to handle over the gear box which handle is able to change the gear of the driving support end from forward to reverse and vice-versa. The cable can also run from the handle to an opposing end of the platform which has an identical, spring, rod on a swivel and a set of beams emanating from the platform. When the end of the rod which is beneath the swivel reaches and makes contact with a barrier fence set up in front of an obstacle, e.g., the barrier fence being about 10 to 50 feet in front of the obstacle, the pressure of contact with the barrier fend causes the end of the rod to be pushed i.e., it pushes the lower end of the rod in, which thus causes the top of the rod to be pushed out in front of the platform, and thus causing the spring so attached to the top of the rod to pull on the cable which in turn pulls the handle of the gear box towards the side of the platform contacting the barrier, and thus, putting it in the opposite direction of movement it had been going prior to arriving at the barrier fence, i.e., reverse or forward. Such can occur in reverse when the irrigation apparatus reaches another barrier fence in the opposite direction. Thus, the irrigation apparatus can reverse direction without the need for any electrical, computer or human intervention. The entire irrigation apparatus can operate without any electrical power or electrical, computer or human intervention.

In a second implementation of the invention there can be provided herein a method of employing the irrigation apparatus described herein. The method can comprise:

providing the herein described irrigation apparatus to a field;

providing water from a water source through the riser pipe in the central tower to the pipeline;

allowing water to enter the water turbine, which in turn generates power which can be used to turn the drive shaft connecting the turbine to the gearbox, which in turn turns other drive shafts which turns the wheels along the platform to cause the driving support end to move in a circular fashion, i.e., rotate around the center tower.

In another aspect, the gasoline engine can be used to move the irrigation apparatus to a suitable position when water is not available.

In yet another aspect, the irrigation apparatus can rotate in a single direction until the driving support end reaches a barrier fence positioned a suitable distance in front of an obstacle in the field, e.g., a building or natural obstacle, at which point the system reverses automatically.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

Figure 1:
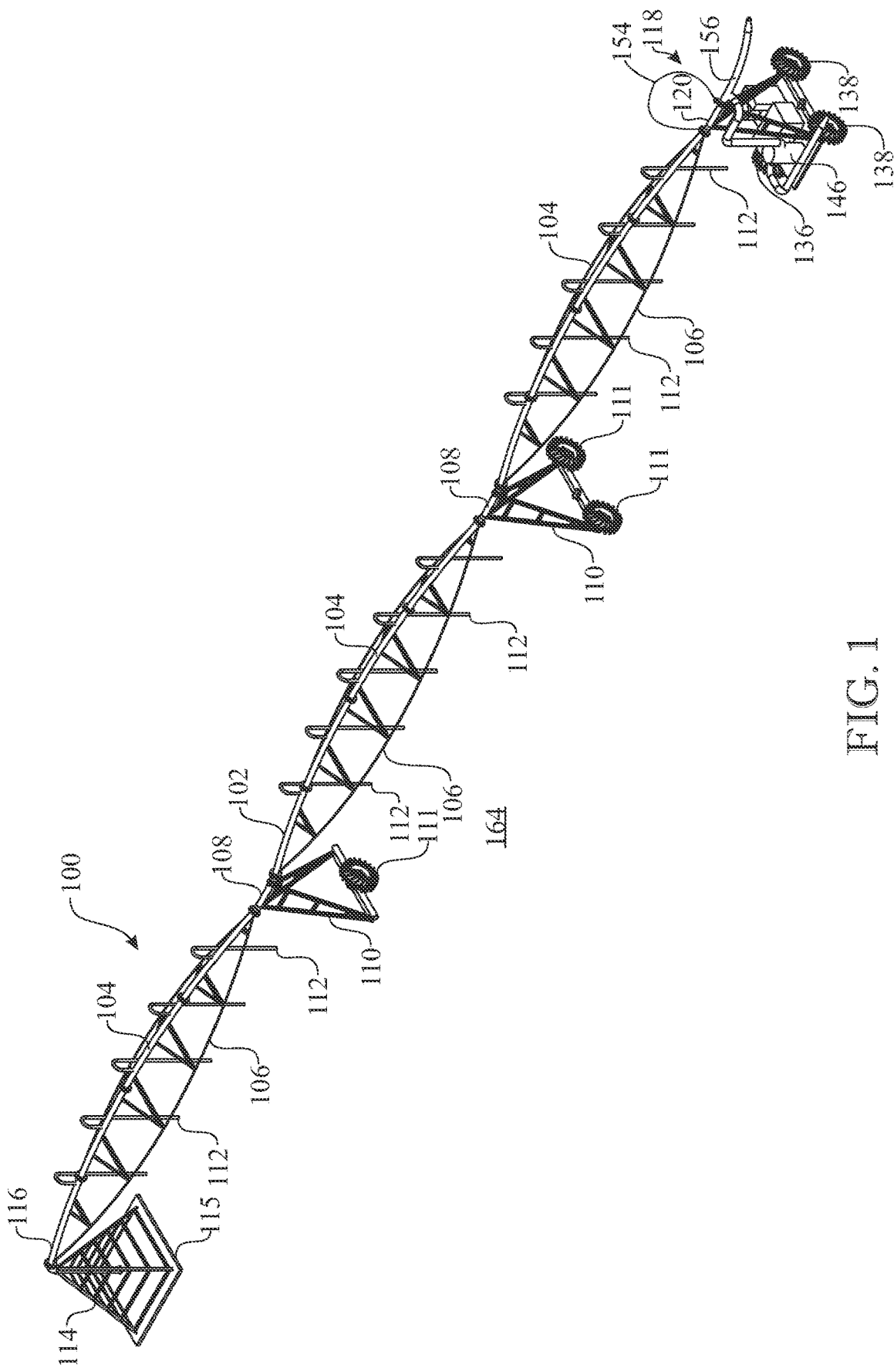
FIG. 1 present a front isometric view showing the general layout of the components of the present invention.
Figure 2:
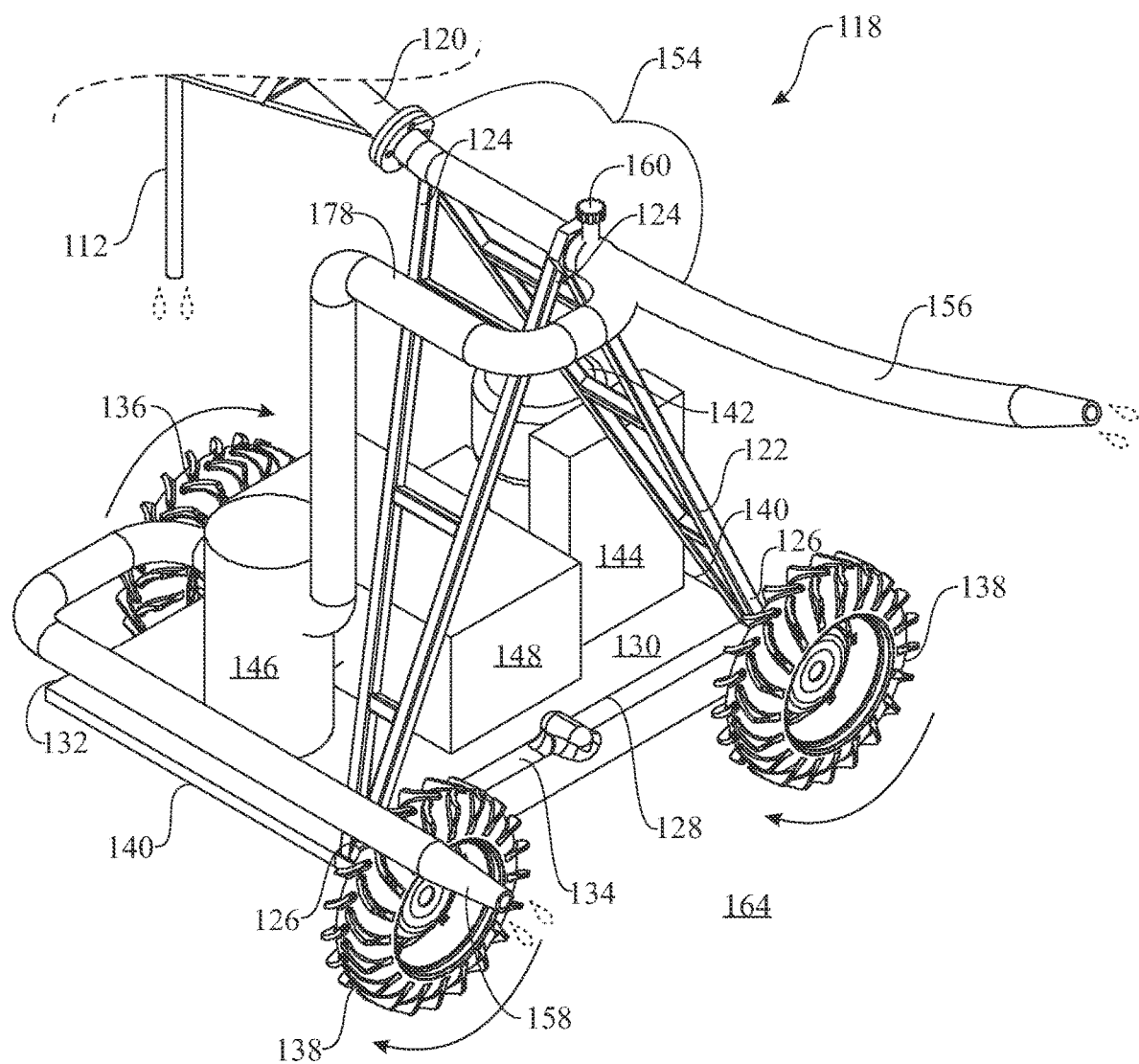
FIG. 2 presents a front isometric view of the driving support end of the irrigation apparatus of FIG. 1.
Figure 3:
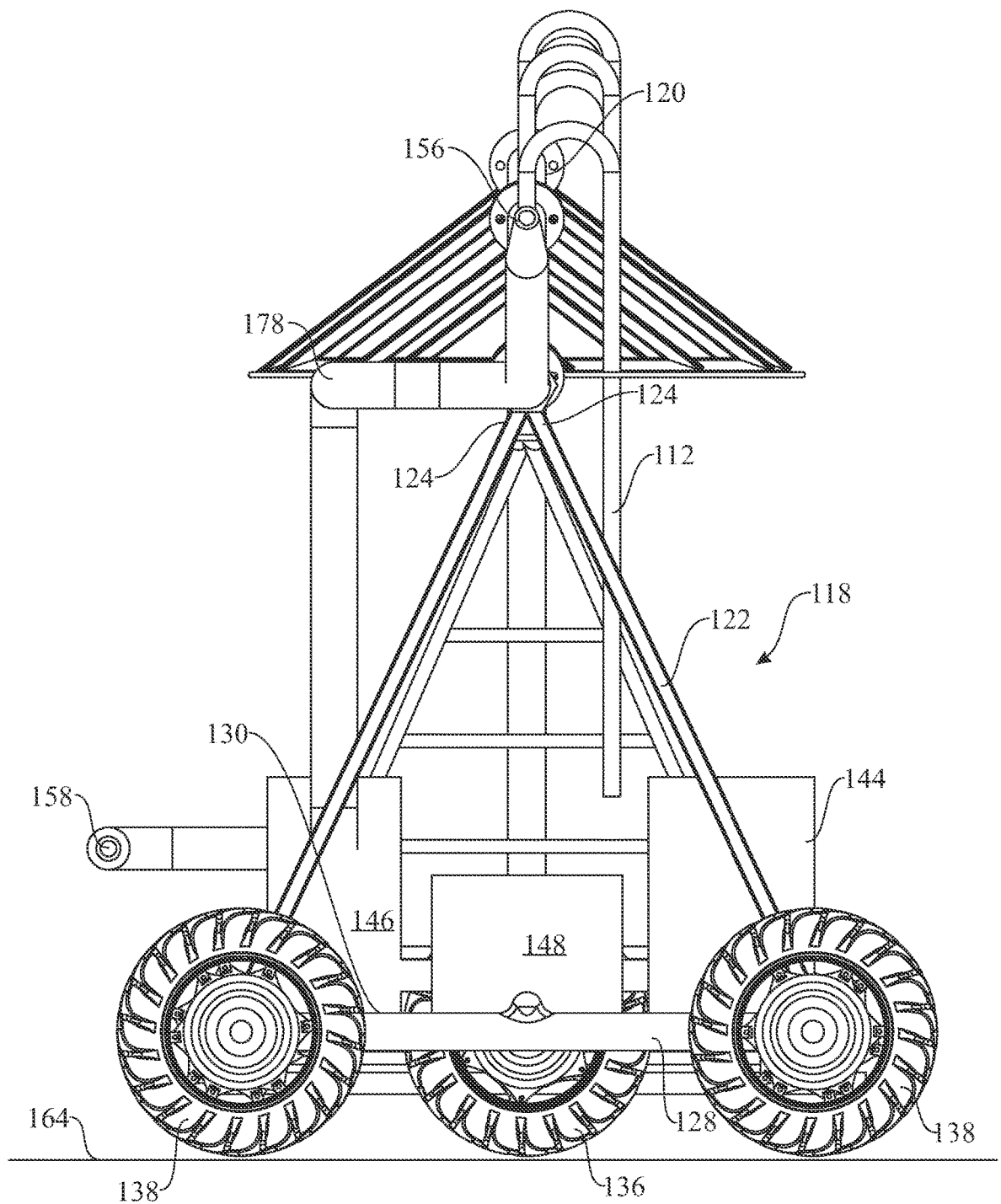
FIG. 3 presents a side view of the invention shown in FIG. 2.
Figure 4:
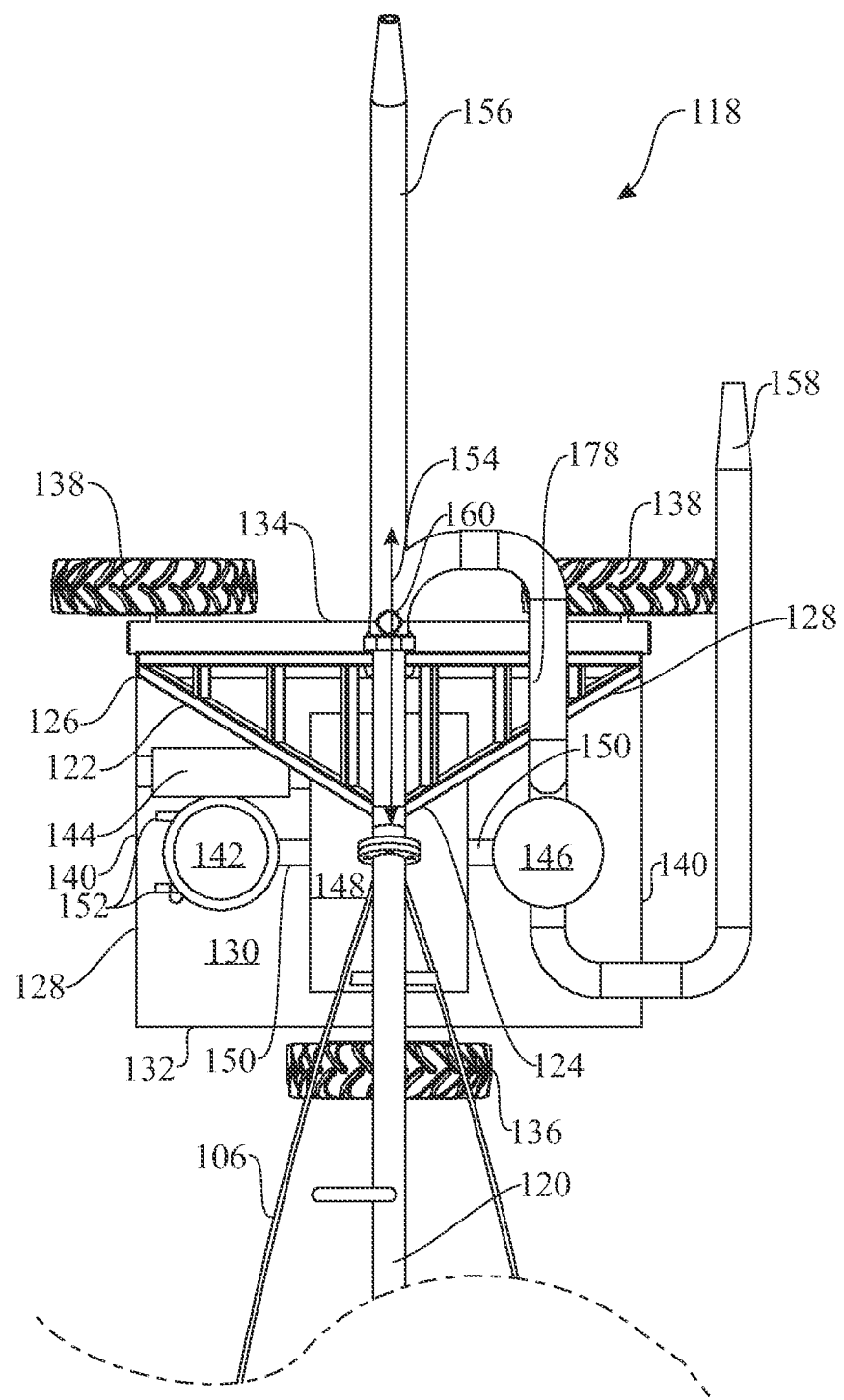
FIG. 4 presents an overhead view of the invention shown in FIG. 2.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1 and/or FIG. 3. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Referring initially to FIGS. 1 and 7-11, there is provided an irrigation apparatus 100 which can comprise an elongated water pipeline 102, which can be comprised of a plurality of pipe spans 104, which can preferably be supported by arched trusses 106. The pipe spans 104 can be joined together by joining sections 108.

Figure 7:
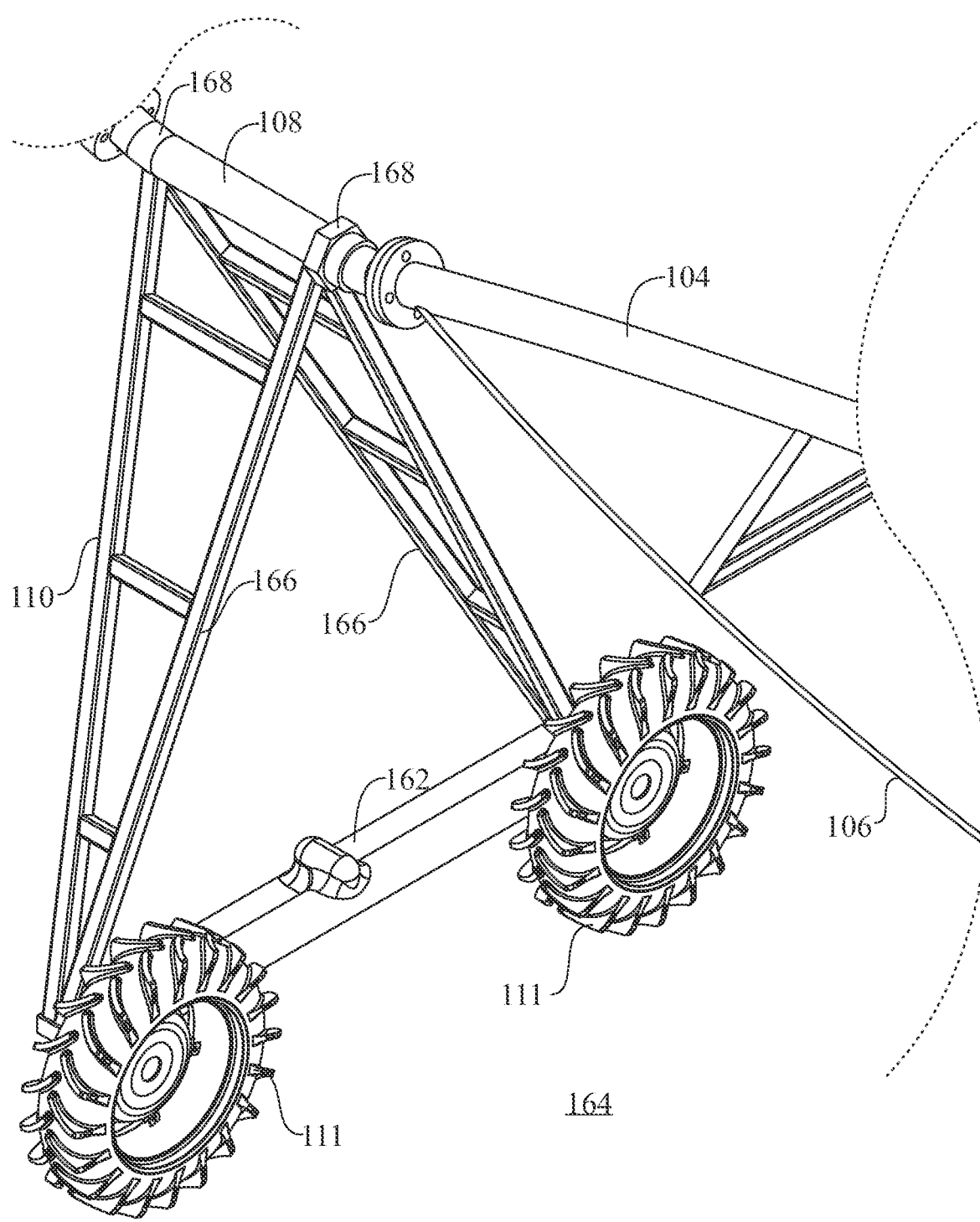
FIG. 7 presents a perspective view of the two wheeled support structure shown in FIG. 1 of the present invention.
Figure 8:
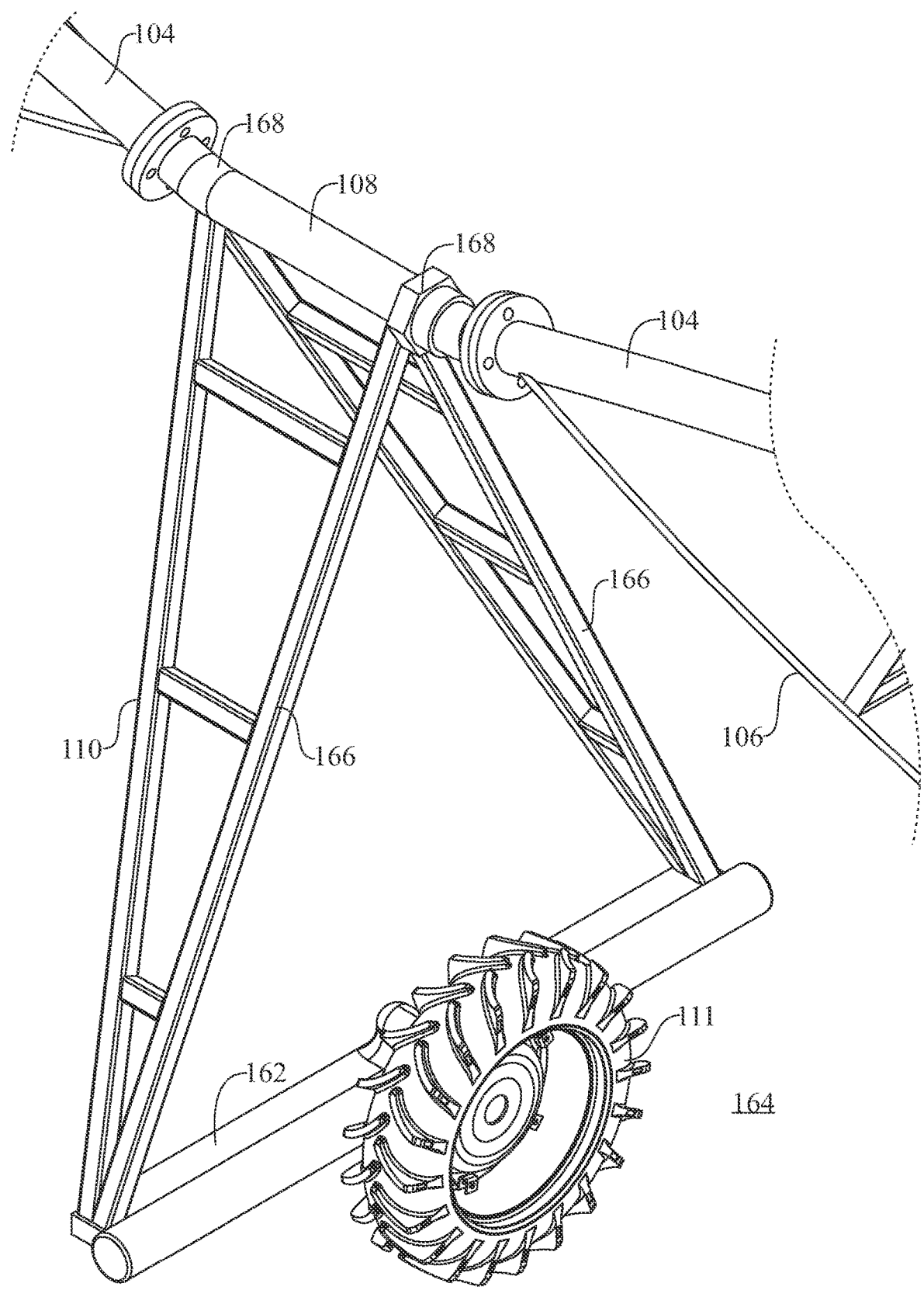
FIG. 8 presents a perspective view of the one wheeled support structure shown in FIG. 1 of the present invention.

Each joining section 108 can have located beneath it a wheeled support structure 110, preferably of an A-frame supported on one wheel 111 or two wheels 111. In one embodiment herein all of the wheels can be the same and can be any of the types of wheels described herein. The A-frame support structure 110 can be made of steel, galvanized steel, aluminum and the like. Referring more specifically to FIGS. 7 and 8, the A-frame support structure 110 can have a triangular shape with a base length 162, which is parallel to the ground 164 can be bound to the other two parts of the triangle, i.e., two angled lengths 166 which can meet at the pipe line 102 joining section 108 and can be connected thereto by using any connection means 168 such as brackets, clasps and the like.

The pipe spans 104 can have a series of water sprinklers 112 located along each of the pipe spans 104 between the joining sections 108, the sprinklers being those known in the art, e.g., downward facing (towards the ground 164).

Figure 5:
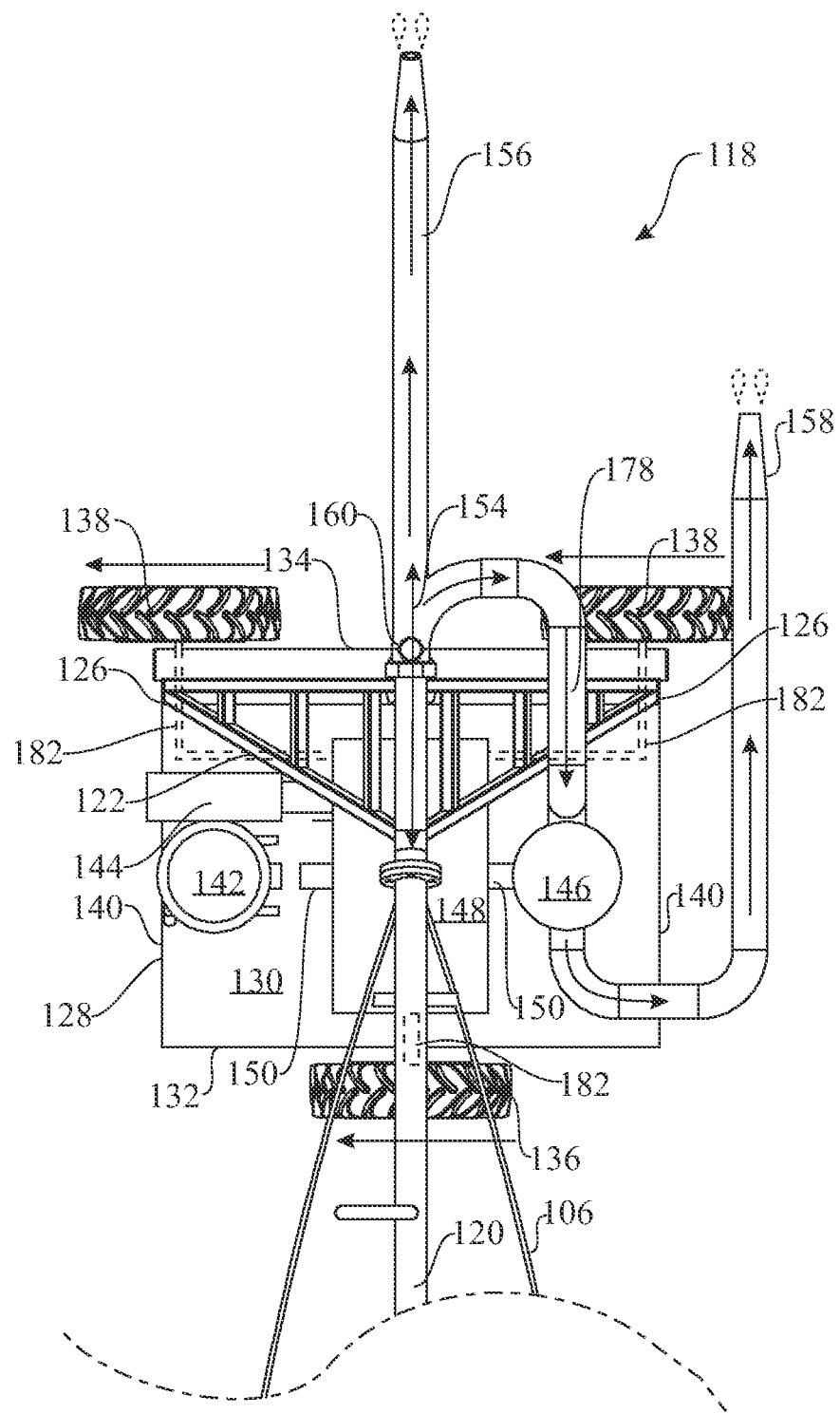
FIG. 5 presents an overhead view of the invention shown in FIG. 4 with the gasoline engine uncoupled and showing the flow of water to the water turbine and to the endgun.
Figure 9:
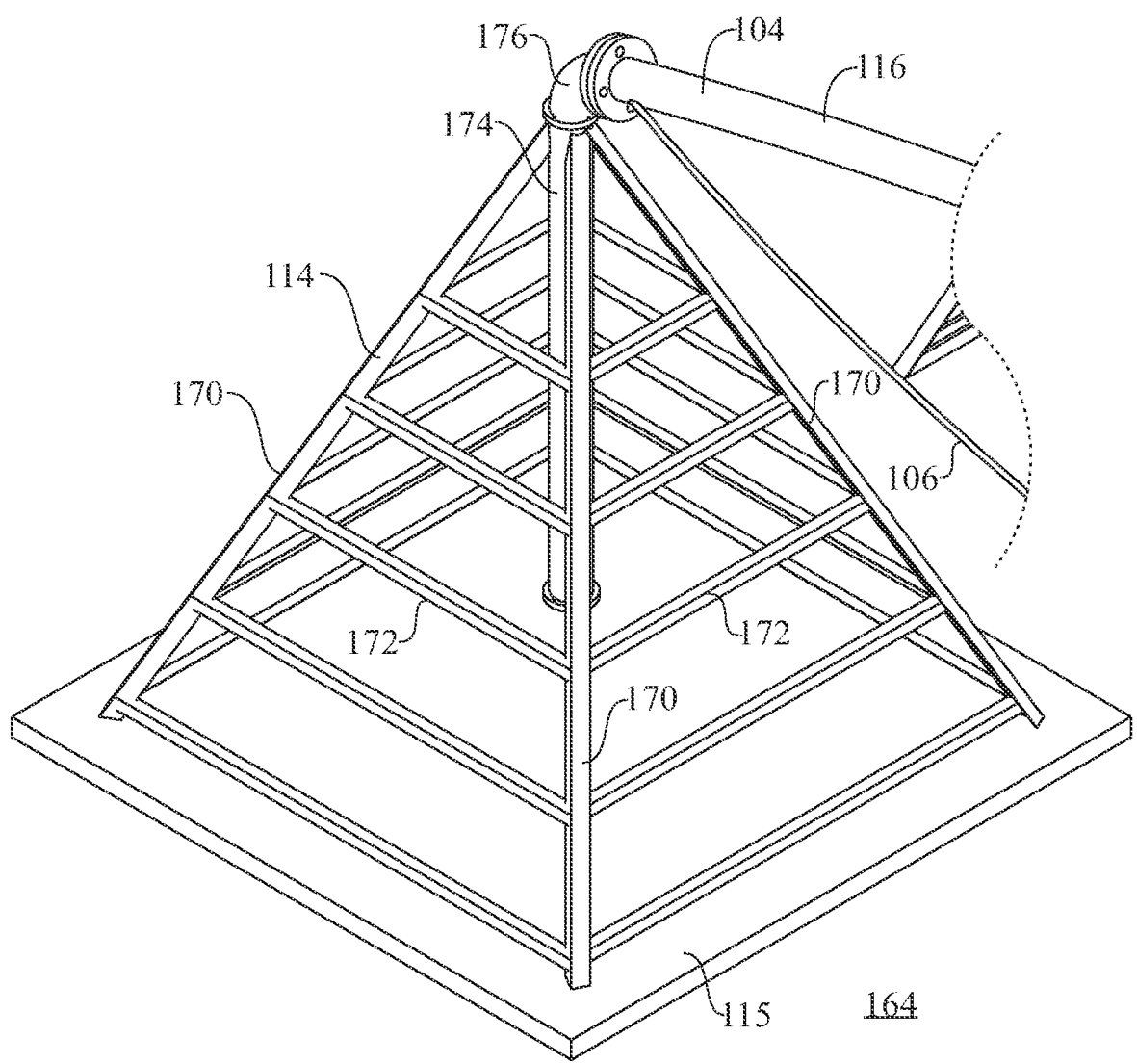
FIG. 9 presents a perspective view of the center tower shown in FIG. 1 of the present invention.

Referring now to FIG. 9, the irrigation apparatus 100 can also comprise a center tower 114 connected to a proximal end 116 of the elongated pipeline 102, which proximal end 116 is configured to operably couple with and rotate around the center tower 114. The center tower 114 can be of a pyramidal shape and can be comprises of pivot legs 170, lateral support beams 172, a riser pipe 174, and a pivot swivel 176 and the center tower 114 can be comprised of any of the materials described herein and can be situated, e.g., bolted to, a concrete slab 115. The elongated water pipeline 102 can rotate around the center tower by using known means for such rotation around a center tower as would be known by those skilled in the art. The riser pipe 174 is connected to the first pipe span 104 through the pivot swivel 176, and the riser pipe 174 supplies water to the rest of the pivot 176 from an under (not shown) ground 164 source Referring to FIGS. 1-6 and 12 there is provided a driving support end 118 connected to a distal end 120 of the elongated water pipeline 102, which distal end 120 is located opposite the proximate end 116. Referring to FIG. 5, the driving support end 118 can driven in the direction shown by the arrows, using only the mechanical power generated by water passing through the water turbine 146 as described herein, e.g., at a pressure of at least 45 psi, which can cause the wheels 136, 138 to move the driving support end 118 in a circular direction as shown by the arrows in FIGS. 10 and 11, wherein in one embodiment, the driving support end 118 drags the wheeled support sections 110 thereafter, with no driving means being independently provided to the wheeled support sections 110 other than that of the dragging force provided by the driving support end 118. The driving support end 118 can comprise a supporting structure 122 having a holding end 124 supporting the distal end 120 of the elongated water pipeline 102 and opposing bracing ends 126.

The driving support end 118 can further comprise a platform 128 having a top surface 130 which supports the bracing ends 126 of the supporting structure 122. The platform 128 can have a proximal longitudinal end 132 and an opposing parallel distal longitudinal end 134. The proximal longitudinal end 132 is closer to the center tower 114 than the distal longitudinal end 134. The inner wheel 136 can be centrally located along the proximal longitudinal end 132 of the platform 128. The two outer wheels 138 can be equidistantly spaced apart along the distal end 134 of the platform 128. The equidistant spacing can comprise placing the wheels an equivalent distance from the lateral ends 140 of the platform 128.

Still referring to FIGS. 1-6 and 12, the platform 128 can have disposed on the top surface 130 a gasoline engine 142 and a gasoline tank 144 for the gasoline engine 142. A water turbine 146 can also be disposed on the top surface 130 of the platform 128. In addition, a gear box can be disposed on the top surface 130 of the platform 128, preferably located between the gasoline engine 142 and the water turbine 146, wherein the water turbine 146 is connected to the gear box 148 by a drive shaft 150. The gasoline engine 142 can be releasably connected to the gear box 148 by the drive shaft 150 and optionally the gasoline engine 142 can sit on rails 152 which can allow the gasoline engine 142 to shift thereon into and out of connection with the drive shaft 150 as desired.

Figure 6:
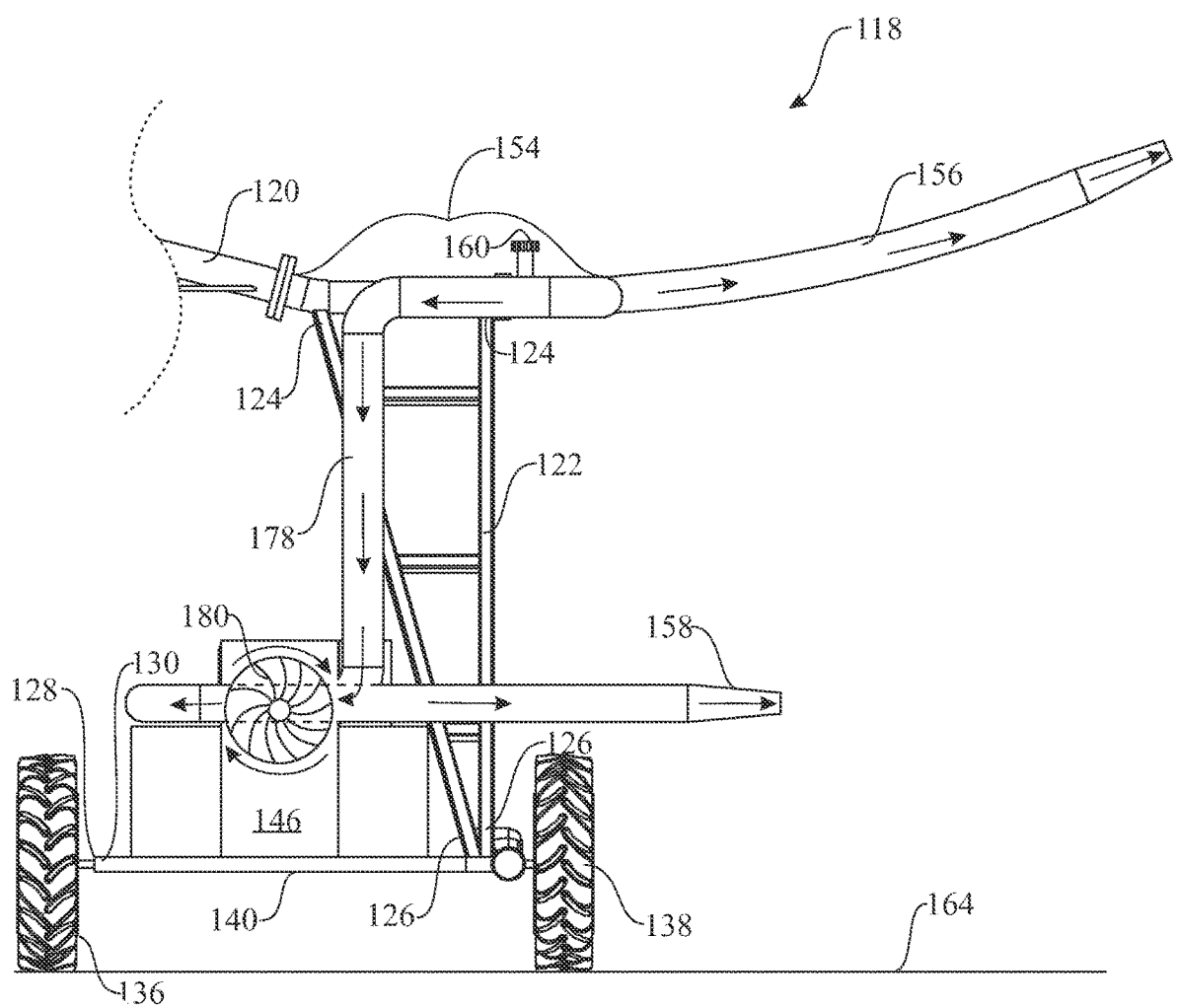
FIG. 6 presents a front view of the invention shown in FIG. 5 showing the flow of water to the water turbine and to the endgun.

Referring now to FIGS. 2 and 4-6, the distal end 120 of the pipeline 102 can be connected to a pipe section 154 which is configured to feed water to the water turbine 146 and to an extender feeder apparatus 156, (extender feeding sprinkler or end gun). The pipe section 154 can have a separate pipe 178 which feeds the water turbine 146, as opposed to the pipe section 154 directly feeding water to the end gun 156. Referring to FIG. 6, the mechanical energy of the driving support end can be generated by the provided water at the provided water pressure contacting and moving the blades 180 of the water turbine 146 which can (refereeing now to FIGS. 4 and 4) provide mechanical power to the drive shaft 150 between the water turbine 146 and the gear box 148, to turn the drive shaft 150, and wherein the drive shaft 150 which is connected to the gear box 148 can then (referring to FIG. 5) be connected to further drive shafts 182 which can turn the wheels 136 and 138.

Referring now to FIGS. 5 and 6, the arrows illustrate the direction of movement of the water as it emanates through the distal end of the pipeline 120 into the pipe section 154 and then sprays out of the end gun 156 or after passing through the water turbine 146 exits the turbine discharge sprinkler 158. The water entering the water turbine 146 can be limited by valve 160 to control the amount of water entering the water turbine 146 through the pipe 178 and the water exiting the end gun 156.

Figure 10:
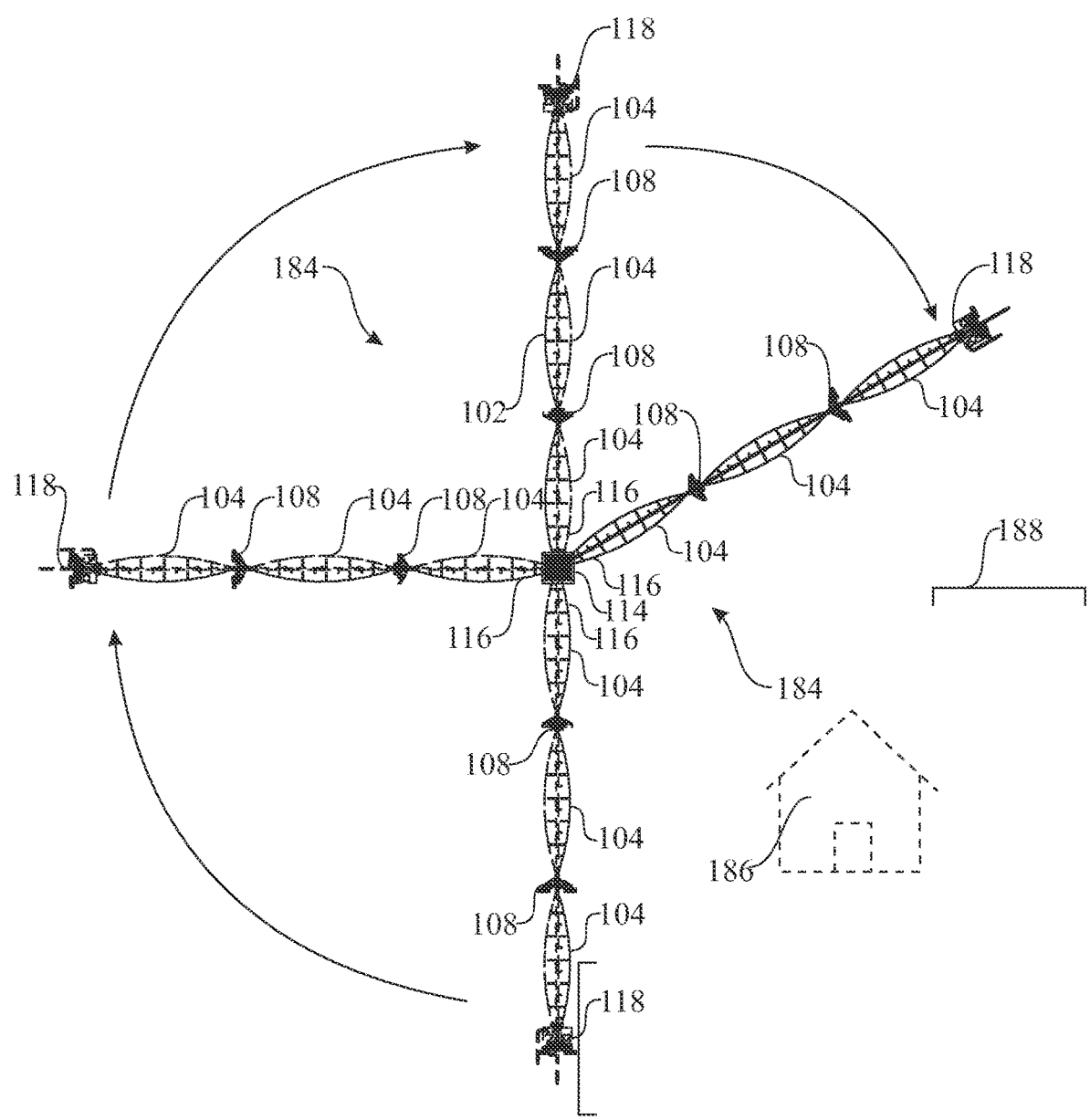
FIG. 10 presents an overhead view of the invention of FIG. 1 shown rotating at various quadrants of rotation prior to encountering the barrier fence in front of the obstruction.
Figure 11:
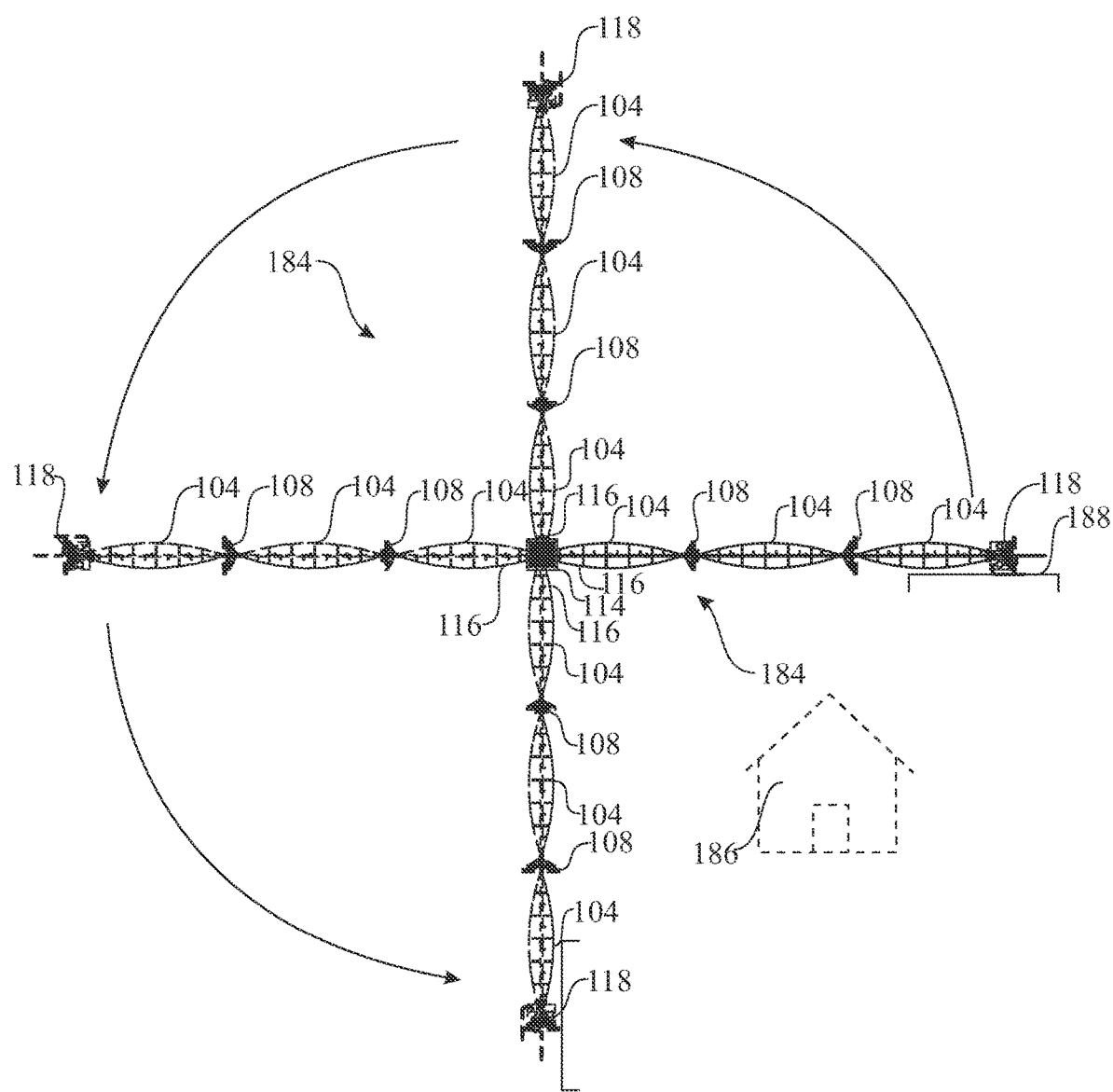
FIG. 11 presents the overhead view of FIG. 10 wherein the front end of driving support end of the apparatus has contacted the barrier fence and is about to reverse direction in the direction shown by the arrows; and, FIG. 12 presents the same a side view of FIG. 3 with the optional reversal mechanism used to change direction of the driving support end being shown.
Figure 12:
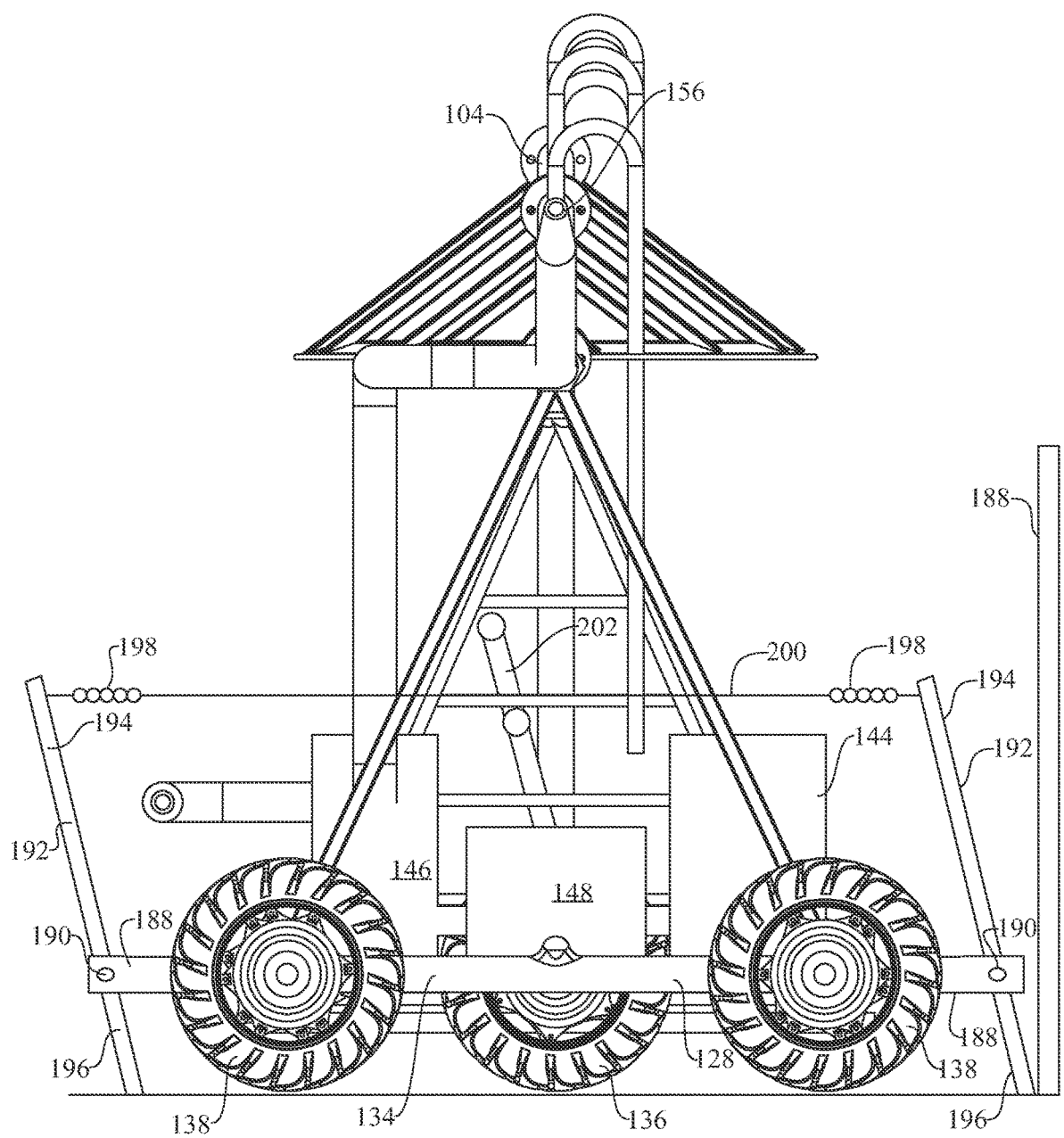

Referring now to FIGS. 10-12, the irrigation apparatus 100 can be provided with the means to reverse the direction of rotation of the circulation of the elongated pipe line 102, e.g., going from the clockwise direction shown by the arrows in FIG. 10 to going in the counter clockwise direction shown by the arrows in FIG. 11. As shown in FIGS. 10 and 11 the field 184 has an obstruction 186 therein. There can be provided a barrier fence 188 in the field 184 a distance in front of the obstruction 186 which would otherwise be in the path of the elongated pipeline 102.

Referring now more specifically to FIG. 12, there can be provided a set of extending beams 188 which extend a distance from the front (see lateral ends 140 in FIGS. 4 and 5) of the platform 128. Between the beams 188 there is an axle 190 and thereon there is a swivel mechanism (not shown) which can cause the rod 192 to swivel such that the top portion 194 moves from a rearward facing direction in FIG. 12 to a forward facing direction, when the bottom portion 196 strikes the barrier fence 188. The contact by the bottom portion 196 on the barrier fence 188 causes the rod 192 to swivel with the bottom portion 196 being moved toward the front lateral end 140 of the platform 128 and the top end 194 being moved away from the front lateral end 140 of the platform 128 and in the direction of the barrier fence 188. The movement of the top portion 194 of the rod 192 causes the spring 198 to pull the cable 200 in the direction of the barrier fence 188 and thus, to cause the cable 200 to pull the lever 202 also towards the barrier fence 188, thus, shifting the gear in the connected gear box 148 to the opposite gear, e.g., into reverse. Such can cause the end support section 118 to now move in the opposite direction as shown in FIG. 11 and away from the obstruction 186. Such can continue in that direction as shown in FIG. 11 until the driving support end 118 by its opposing rod 192 contacts its lower portion 196 on the lower barrier fence 118 and then the reversal of direction occurs again in the same fashion.

In an alternative embodiment herein, the only power provided to the irrigation device is through the mechanical power provided by the water hitting the blades of the water turbine. In another non-limiting embodiment, the pipe spans described herein are not pivotable along their joining segments, but the irrigation apparatus is only pivotable around the center tower. The irrigation device described herein can be run continuously without any human intervention.

Since many modifications, variations, and changes in detail can be made to the described preferred embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

What is claimed is:

1. An irrigation apparatus comprising:
   an elongated water pipeline comprised of a plurality of pipe spans each joined together by joining sections;
   a wheeled support structure located below each joining section;
   a series of water sprinklers located along each of the pipe spans between the joining sections;
   a center tower connected to a proximal end of the elongated water pipeline, which proximal end is configured to operably couple with and rotate around the center tower;
   a driving support end connected to a distal end of the elongated water pipeline, which is opposite the proximal end, and the driving support end further comprising:
      a supporting structure having a holding end supporting the distal end of the elongated water pipeline, and opposing bracing ends,
      a platform having a top surface which supports the bracing ends of the supporting structure, a proximal longitudinal end, and an opposing parallel distal longitudinal end, the proximal longitudinal end being closer to the center tower than the distal longitudinal end,
      an inner wheel centrally located along the proximal longitudinal end of the platform;

two outer wheels equidistantly spaced apart along the distal longitudinal end of the platform, a gasoline engine disposed on the top surface of the platform, a water turbine disposed on the top surface of the platform, a gear box disposed on the top surface of the platform between the gasoline engine and the water turbine, and wherein the water turbine is connected to the gear box by a drive shaft, and wherein the gasoline engine is releasably connectable to the gear box by the drive shaft, and wherein the distal end of the elongated water pipeline has a pipe section which is configured to feed water to the water turbine and to an extender feeding sprinkler;

a plurality of rods which extend a distance from a front of the platform; and an axle between the plurality of rods, the axle further comprising a swivel mechanism which can cause a particular one rod to swivel such that a top portion of the particular one rod moves from a rearward facing direction to a forward facing direction when a bottom portion of the particular one rod strikes an obstruction in a path of the elongated water pipeline, wherein contact by the bottom portion of the particular one rod on the obstruction causes the particular one rod to swivel with the bottom portion of the particular one rod being moved toward a front lateral end of the platform and the top end of the particular one rod being moved away from the front lateral end of the platform and in the direction of the obstruction, and the movement of the top portion of the particular one rod causes a spring to pull a cable in the direction of the obstruction and thus, to cause the cable to pull a lever also towards the obstruction, thus, shifting a gear in the connected gear box to an opposite gear such that a direction of rotation of the circulation of the elongated pipeline is reversed while maintaining a physical shape of the elongated water pipeline during and after the reversal.

2. The irrigation apparatus of claim 1, wherein the elongated water pipeline is comprised of at least three pipe spans, which can each be from 20 meters to 40 meters in length, and from about ½ inch to about 15 inches in outside diameter.

3. The irrigation apparatus of claim 1, wherein the elongated water pipeline is made of a material selected from the group consisting of metal, elastomer material, polymer and combinations thereof.

4. The irrigation apparatus of claim 1, wherein the pipe spans are curved in an arc, and supported underneath on trusses, and are 1.5 meters to 3 meters apart.

5. The irrigation apparatus of claim 1, wherein the pipe spans are joined together by joining sections which are flexible joints, made of a flexible elastomer material selected from the group consisting of EPDM, rubber, polyethylene, polypropylene and copolymers thereof, which connect an outer end of one pipe span with an inner end of the adjacent pipe span.

6. The irrigation apparatus of claim 1, wherein, the wheeled support structure located below each joining section is a wheeled A-frame support frame, which can range from 2.5 meters to 3.5 meters in height.

7. The irrigation apparatus of claim 1, the series of water sprinklers located along each of the pipe spans between the joining sections comprise downward facing sprinklers, sprayers, or bubblers which pass up from pipe span and then reverse direction passing through the triangular support frames and face the ground and are 1.5 to 3 meters apart.

8. The irrigation apparatus of claim 1, wherein the center tower connected to a proximal end of the elongated water pipeline, is a central pivot point for the irrigation apparatus.

9. The irrigation apparatus of claim 1, wherein the apparatus is in the absence of a control panel.

10. The irrigation apparatus of claim 1, wherein the driving support end connected to a distal end of the elongated water pipeline, which is opposite the proximal end is configured to provide the power to the wheels of the driving support end and the wheels of the wheeled support structure under each joining section to rotate the pipeline around the center tower.

11. The irrigation apparatus of claim 1, wherein the gasoline engine disposed on the top surface of the platform is from 5 horsepower to 100 horsepower.

12. The irrigation apparatus of claim 1, wherein the gasoline engine is mounted on the platform on rails, which rails permit the gasoline engine to be disconnected from the gear box when not in use.

13. The irrigation apparatus of claim 12, wherein the rails permit the gasoline engine to connect or disconnect from the gear box by a releasable connection to the drive shaft therebetween.

14. The irrigation apparatus of claim 1, wherein the water turbine is capable of generating from 100 watts to 50 kilowatts and is fed by a distal portion of the pipeline, beyond the last pipe span.

15. The irrigation apparatus of claim 1, wherein the water turbine is capable of operating without any electrical power and without being connected to an electrical engine.

16. The irrigation apparatus of claim 1, wherein the water turbine also has an output which functions to provide water via a sprinkler nozzle in the direction beyond the distal longitudinal end of the platform, which is in addition to the water being provided by the extender feeding sprinkler.

17. The irrigation apparatus of claim 1, wherein the irrigation apparatus is configured such that the rate of water flow to the turbine is capable of controlling the mechanical power provided to the gearbox and the drive shafts driving the wheels along the platform, to control the speed of movement of the irrigation apparatus.

18. A method comprising
providing the irrigation apparatus of claim 1 to a field;
providing water from a water source through a riser pipe in the central tower to the pipeline;
allowing water to enter the water turbine, which in turn generates power which is capable of turning the drive shaft connecting the turbine to the gearbox, which in turn turns other drive shafts which turns the wheels along the platform to cause the driving support end to move in a circular fashion.

19. The method of claim 1 further comprising using the gasoline engine to move the irrigation apparatus to a suitable position in the field when water is not available.

20. The method of claim 19 wherein the plurality of pipe spans are not pivotable along their joining segments such that the irrigation apparatus is only pivotable around the center tower.

* * * * *